Figures 1, 2:
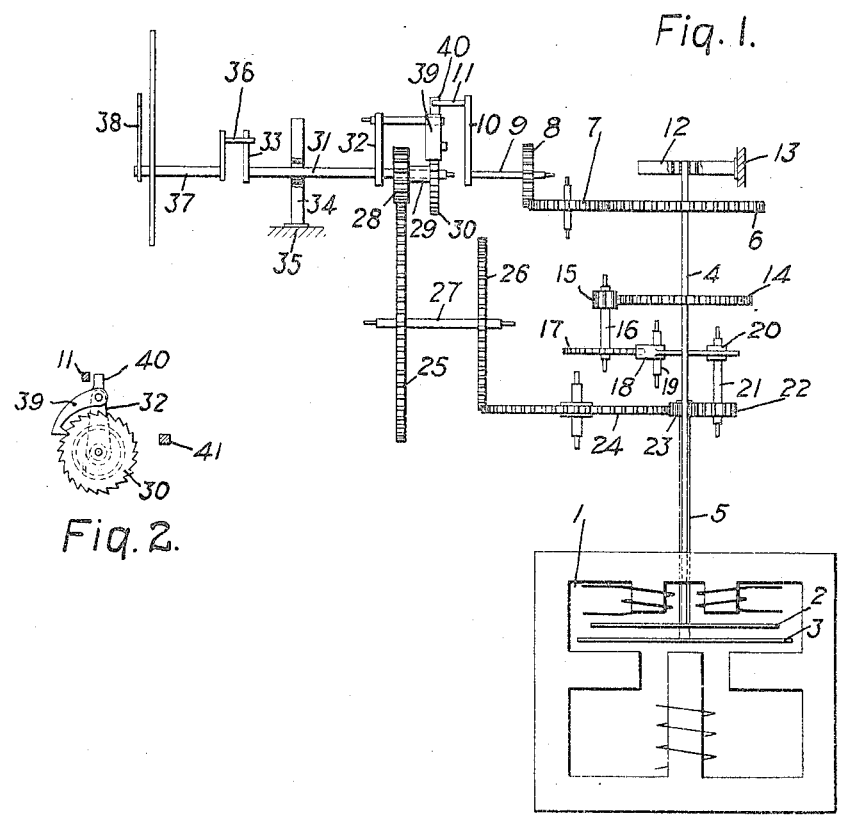

C. A. BODDIE.
ELECTRICAL MEASURING INSTRUMENT.
APPLICATION FILED OCT. 7, 1915.

1,206,295.

Patented Nov. 28, 1916.

WITNESSES:

INVENTOR
Clarence A. Boddie.
BY
Wesley G. Carr
ATTORNEY

UNITED STATES PATENT OFFICE.

CLARENCE A. BODDIE, OF PITTSBURGH, PENNSYLVANIA, ASSIGNOR TO WESTINGHOUSE ELECTRIC AND MANUFACTURING COMPANY, A CORPORATION OF PENNSYLVANIA.

ELECTRICAL MEASURING INSTRUMENT.

1,206,295.

Specification of Letters Patent.   Patented Nov. 28, 1916.

Application filed October 7, 1915. Serial No. 54,591.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Electrical Measuring Instruments, of which the following is a specification.

My invention relates to electrical measuring instruments and particularly to maximum-demand wattmeters.

The object of my invention is to provide a meter, of the above indicated character, having means for so periodically resetting a part of the mechanism thereof as to obtain a true indication of the maximum demand.

My copending U. S. application Serial No. 771,883, filed June 5, 1913, discloses a maximum-demand wattmeter having two armature members that are simultaneously supplied with similar actuating forces. One of the armature members actuates an integrating mechanism and the other actuates an indicating mechanism. Means is interposed between the two mechanisms whereby one controls the operation of the other, and means is also provided for resetting a portion of the indicating mechanism when no current traverses the meter. In a device of this type, the various indications of maximum demand are not obtained with respect to a common starting point unless the current traversing the same is periodically reduced to zero.

In my present invention, I provide a wattmeter having two rotatable armatures one of which actuates an indicating or limiting device that is controlled by the other armature, and the other armature of which actuates a gear train, that, in turn, operates an indicating pointer. Means is also provided whereby the gear train is periodically reset by the indicating or limiting device to cause the indications of maximum demand to be accurately obtained with respect to a common starting point.

Figure 1 of the accompanying drawing is a diagrammatic view, partially in elevation and partially in section, of a maximum-demand meter embodying my invention, and Fig. 2 is a detail view of a part of the apparatus embodying my invention.

A wattmeter 1 is provided with two armatures 2 and 3 that are disposed in the same air gap and simultaneously subjected to similar actuating forces. The armature 2, that may be assumed to be an auxiliary armature, is mounted on a shaft 4, and the armature 3, that may be assumed to be the main armature, is mounted on a shaft 5. A gear wheel 6 is mounted on the shaft 4 to engage a gear wheel 7 that is adapted to engage a gear wheel 8 which is mounted on a shaft 9. The shaft 9 has an arm 10 mounted thereon that is provided with a pin 11. The inner end of a spring 12 is operatively connected to the shaft 4 and the other end thereof is connected to a stationary member 13. A gear wheel 14, that is mounted on the shaft 4, is adapted to engage a pinion 15 that is mounted on a shaft 16 upon which an escapement wheel 17 is also mounted. A double-palet escapement 18, that is pivotally mounted on a shaft 19, is adapted to be actuated by an eccentric 20 that is mounted on a shaft 21. A gear wheel 22, that is mounted on the shaft 21, engages a pinion 23 which is mounted on the shaft 5. The arm 10 may be assumed to be an indicating or limiting device and is adapted to move a distance that is proportional to the energy traversing the windings of the meter 1. However, the time required for the arm 10 to move this distance is controlled by the movement of the armature 3 which operates in accordance with the rate of consumption of energy.

The pinion 23 engages a gear wheel 24 that drives a gear wheel 25 through a gear wheel 26 and a shaft 27. The gear wheel 25 engages a pinion 28 that is mounted on a sleeve 29 which is provided with a ratchet wheel 30. The sleeve 29 loosely surrounds a shaft 31 that is provided with two arms 32 and 33 and to which the inner end of a spring 34 is connected. The other end of the spring 34 is connected to a stationary member 35. The arm 33 is adapted to engage a dog 36 that is mounted on a shaft 37 upon which a pointer 38 is also mounted. A pawl 39 is pivotally mounted on the arm 32 and is adapted to engage the teeth of the ratchet wheel 30. A projecting portion 40 of the pawl 39 is adapted to engage the pin or projection 11 of the arm 10 and a stationary pin or stop 41, under predetermined conditions.

When current traverses the winding of the meter 1, the armature 2 tends to turn the arm 10 and the pin 11 against the action of the spring 12 to such position as to provide an indication of the value of energy being measured. However, it will require a predetermined time, to indicate this energy, that is dependent on the rotation of the armature 3, or, in other words, on the rate of consumption of energy. The armature 3 turns the pointer 38, through the pinion 23, the gear wheels 24, 26, 25 and 28, the ratchet wheel 30, the pawl 39, the shaft 31, the dog 36 and the shaft 37, until the projection 40 engages the pin 11 to disengage the pawl 39 from the ratchet wheel 30. After the pawl 39 is disengaged from the ratchet wheel 30, the spring 34 rotates the shaft 31 backwardly to its initial position, and, when the shaft 31 reaches its initial position, the pin 41 engages the projection 40 to cause the pawl 39 to reëngage the ratchet wheel 30. During the rotation of the shaft 31 to its initial position, the pointer 38 and the shaft 37 remain stationary. Thus, the pointer 38 is left in a position to indicate the maximum demand for a time that is dependent upon the rate of consumption of energy.

Assuming, for convenience of illustration, that the power decreases in value, the arm 10 will turn backwardly to engage the projection 40 and to thus disengage the pawl 39 from the ratchet wheel 30 before the arm 33 engages the dog 36. The pointer 38 will not, in this case, be actuated. However, if the power traversing the meter 1 increases in value, the arm 10 will move forwardly to permit the arm 33 to engage the dog 36 before the pawl 39 is disengaged from the ratchet wheel 30. Thus, the pointer 38 is advanced to indicate the new maximum demand.

A maximum-demand meter constructed according to my invention indicates the maximum demand that persists for predetermined intervals of time, and is advantageous in that each demand period is started from a common starting point. Thus, the times required for the pointer 38 to indicate demands of the same value shall be equal.

It will be understood that many modifications may be made in the structure of my invention without departing from the spirit and scope of the same, as set forth in the appended claims.

I claim as my invention:

1. A meter comprising a main and an auxiliary rotatable armature, means for simultaneously applying similar actuating forces to said armatures, as indicating mechanism actuated by the auxiliary armature and controlled by the main armature, a pointer, means actuated by the main armature and adapted to actuate the pointer, and means actuated by the indicating mechanism for controlling the resetting of the said means actuated by the main armature.

2. A meter comprising two rotatable members, means for simultaneously applying similar actuating forces to said members, an indicating mechanism actuated by one member and controlled by the other, a pointer, means actuated by the rotatable member that controls the indicating mechanism and adapted to actuate the pointer, and means actuated by the indicating mechanism for controlling the resetting of the said means that is adapted to actuate the pointer.

3. A meter comprising a main and an auxiliary rotatable member, means for simultaneously applying similar actuating forces to said members, an indicating mechanism actuated by the auxiliary member and controlled by the main member, a pointer, means actuated by the main member and adapted to actuate the pointer, and means actuated by the indicating mechanism for periodically disengaging the pointer from the means for actuating it.

4. In an electrical measuring instrument, the combination with means for integrating power and means controlled by the integrating means for indicating power, of means actuated by the means for indicating power for controlling the resetting of a portion of the integrating means periodically.

5. A meter comprising two rotatable members, a mechanism actuated by one of the members and controlled by the other, a pointer, means actuated by the rotatable member that controls the said mechanism and adapted to actuate the pointer, and means actuated by the said mechanism for periodically disengaging the pointer from the said means for actuating it.

6. A meter comprising a main and an auxiliary rotatable member, a stop actuated by the auxiliary member, a pointer, means actuated by the main member for actuating the pointer and means actuated by the stop for periodically disconnecting the pointer from the means that is actuated by the main member.

7. A wattmeter comprising a main and an auxiliary armature, means for simultaneously applying similar actuating forces to the said armatures, a stop actuated by the auxiliary armature, an escapement device actuated by the main armature for controlling the operation of the stop, a gear train actuated by the main armature, a spring-restrained shaft adapted to be actuated by the gear train, a pointer adapted to be actuated by the shaft under predetermined conditions and means for operatively connecting the shaft to the gear train that is actuated by the stop to disengage the shaft from the gear train periodically.

8. A wattmeter comprising two movable members, a single means for applying similar actuating forces to the movable members, means interposed between the two movable members whereby one causes the operation of the other to be delayed an interval of time, a stop actuated by the movable member that is delayed in its operation, and a pointer actuated by the other movable member, said stop being adapted to disconnect the pointer from the non-delayed movable member under predetermined conditions.

9. A wattmeter comprising two movable members, a single means for applying similar actuating forces to the movable members, means interposed between the two movable members whereby one causes the operation of the other to be delayed an interval of time, a stop actuated by the movable member that is delayed in its operation, and a pointer actuated by the other movable member, said stop being adapted to disconnect the pointer from the non-delayed movable member when the movable member that is delayed in its operation has moved a predetermined distance.

10. A wattmeter comprising two movable members, a single means for applying similar actuating forces to the movable members, means interposed between the two movable members whereby one causes the operation of the other to be delayed an interval of time, a stop actuated by the movable member that is delayed in its operation, and a pointer actuated by the other movable member, said stop being adapted to disconnect the pointer from the non-delayed movable member when the movable member that is delayed in its operation has moved a distance in accordance with the energy being measured.

11. A meter comprising two movable members, a pointer, means actuated by one movable member for actuating the pointer and means actuated by both of the movable members for disengaging said pointer from the movable member that actuates it.

12. A meter comprising two movable members, a pointer adapted to be actuated by one of the movable members, and means actuated by both of the movable members for disengaging the said pointer from the movable member that actuates it.

13. A meter comprising two movable members, a pointer adapted to be actuated by one of the movable members, and means actuated by the other movable member for periodically disengaging the said pointer from the movable member that actuates it.

14. A meter comprising two movable members, a pointer, means actuated by one movable member for actuating the pointer and means actuated by both of the movable members for coöperating to effect the disengagement of the said pointer from the movable member that actuates it.

In testimony whereof, I have hereunto subscribed my name this 23rd day of Sept., 1915.

CLARENCE A. BODDIE.